(12) United States Patent
Israel et al.

(10) Patent No.: US 10,757,110 B2
(45) Date of Patent: Aug. 25, 2020

(54) GENERATION OF APPLICATION ALLOWED LISTS FOR MACHINES

(71) Applicant: Microsoft Technology Licensing, LLC, Redmond, WA (US)

(72) Inventors: Moshe Israel, Herzeliya (IL); Ronen Yaari, Herzeliya (IL); Ben Kliger, Herzeliya (IL); Yaniv Dagan, Herzeliya (IL); Gilad Elyashar, Herzeliya (IL); Moshe Shalala, Herzeliya (IL); Erel Hansav, Kfar Saba (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 260 days.

(21) Appl. No.: 15/387,427

(22) Filed: Dec. 21, 2016

(65) Prior Publication Data

US 2018/0176227 A1 Jun. 21, 2018

(51) Int. Cl.
| | |
|---|---|
| *H04L 29/06* | (2006.01) |
| *G06F 21/10* | (2013.01) |
| *H04W 12/08* | (2009.01) |
| *H04L 29/08* | (2006.01) |
| *G06F 21/55* | (2013.01) |
| *G06F 16/00* | (2019.01) |
| *G06F 11/34* | (2006.01) |

(52) U.S. Cl.
CPC ............ *H04L 63/104* (2013.01); *G06F 21/10* (2013.01); *H04L 63/10* (2013.01); *H04L 63/101* (2013.01); *H04L 67/30* (2013.01); *H04W 12/08* (2013.01); *G06F 11/34* (2013.01); *G06F 16/00* (2019.01); *G06F 21/552* (2013.01)

(58) Field of Classification Search
CPC ....................................................... H04L 63/104
USPC ............................................................. 726/27
See application file for complete search history.

(56) References Cited

U.S. PATENT DOCUMENTS

| | | | |
|---|---|---|---|
| 9,003,389 B2 * | 4/2015 | Vidal ...................... | G06F 8/453 |
| | | | 717/168 |
| 10,049,646 B2 * | 8/2018 | Diard ..................... | A63F 13/355 |
| 2002/0131404 A1 | 9/2002 | Mehta et al. | |

(Continued)

OTHER PUBLICATIONS

"International Search Report and Written Opinion Issued in PCT Application No. PCT/US2017/065942", dated Feb. 13, 2018, 11 Pages.

*Primary Examiner* — Khalil Naghdali
(74) *Attorney, Agent, or Firm* — Dicke, Billig & Czaja, PLLC

(57) ABSTRACT

A computing system for generating allowed lists of applications for machines is provided. The system, for each machine, identifies a set of executed applications that were executed by that machine. The system then clusters the machines based on similarity between the sets of executed applications so that machines with similar sets are in the same cluster. The system then, for each cluster of machines, creates an allowed list of applications for the cluster that includes the applications in the sets of executed applications of the machines of the cluster. An allowed list for a cluster indicates that only applications in the allowed list are allowed to be executed by a machine in the cluster. The system then distributes the allowed list for a cluster to the machines of that cluster so that the machines execute only applications in the allowed list for their cluster.

18 Claims, 11 Drawing Sheets

(56) References Cited

U.S. PATENT DOCUMENTS

| | | | |
|---|---|---|---|
| 2011/0247074 A1* | 10/2011 | Manring | G06F 21/57 |
| | | | 726/26 |
| 2013/0104118 A1 | 4/2013 | Somani et al. | |
| 2014/0331277 A1* | 11/2014 | Frascadore | H04L 63/20 |
| | | | 726/1 |
| 2015/0009222 A1* | 1/2015 | Diard | G06F 9/45533 |
| | | | 345/505 |
| 2015/0194136 A1* | 7/2015 | Diard | G09G 5/393 |
| | | | 345/547 |
| 2015/0339475 A1 | 11/2015 | Feroz et al. | |
| 2016/0080399 A1* | 3/2016 | Harris | H04L 63/1416 |
| | | | 726/23 |
| 2016/0291840 A1 | 10/2016 | Patil et al. | |

* cited by examiner

GENERATION OF APPLICATION ALLOWED LISTS FOR MACHINES

BACKGROUND

Cyber-attacks cost companies and individuals billions of dollars. A report in 2015 estimated that cyber-attacks cost companies over $400 billion annually. In addition to the financial costs, cyber-attacks may result in other damages such as the destruction of valuable information, the release of sensitive information, and so on. The costs and damages will surely increase over time without effective defenses. Cyber-attacks often rely on malicious software, referred to as "malware," which is installed and executed by a computer that is the target of the attack. The executing malware orchestrates the attack. For example, a ransomware attack may encrypt all the data on a computer, including the only copy of financial documents, family photographs, electronic mail messages, and so on. If the ransom is not paid, then the data may remain encrypted forever. Even if the ransom is paid, the attacker might not provide the key to decrypt the data. Because of the high costs of cyber-attacks, companies and individuals expend considerable resources in developing and purchasing security systems as defenses to cyber-attacks. These security systems include firewall systems, antivirus systems, authentication systems, intrusion prevention systems, access control systems, application blocking systems, and so on.

Malware can be installed on a computer in various ways. For example, ransomware may arrive as an email attachment that contains garbled content and a malicious macro. When the user opens the attachment, the attachment requests the user to enable macros if the content appears garbled. When the user enables the macros, the malicious macro installs and executes the ransomware. As another example, an employee of a corporation may install an unauthorized application on their computer. Normally, the information technology group of a corporation analyzes and authorizes only those applications that meet the strict security standards of the corporation. If an unauthorized application is installed, it can expose all the computers on the network of the corporation to vulnerabilities that significantly increase the chance of a cyber-attack against the corporation.

An organization may have thousands of servers and thousands of user computers (e.g., desktops and laptops) connected to its network. The servers may each be a certain type of server, such as a load balancing server, a firewall server, a database server, an authentication server, a personnel management server, a web server, a file system server, and so on. In addition, the user computers may each be a certain type, such as a management computer, a technical support computer, a developer computer, a secretarial computer, and so on. Each server and user computer may have various applications installed that are needed to support the function of the computer. Because of the various types of servers and user computers, such a network is referred to as a "hybrid environment."

It can be a difficult task to ensure that each computer can execute only authorized applications. As used herein, the term "application" refers to any software that can be separately identified and executed, such as application programs, applets, dynamic-link libraries, operating system software, scripts, add-ins, operating system drivers, and so on. To help support this difficult task, security tools may be installed on each computer to help ensure that only certain authorized applications are allowed to execute on each computer. The security tool may allow an administrator to generate an allowed list for each computer that lists the authorized applications that are allowed to be executed by that computer. When the operating system executing on a computer receives a request to execute an application, the operating system asks the security tool whether to allow the execution. If the application is in the allowed list, the security tool indicates that execution is allowed. Otherwise, the security tool indicates that the execution is to be blocked.

The maintaining of the allowed lists for the computers in a large organization can be a daunting task. In addition to the initial setup of the allowed lists, an administrator needs to update the allowed lists as the needs of the organization change, as new versions of applications are released, as new computers come online, and so on. Moreover, an improperly maintained allowed list can expose the organization to vulnerabilities such as cyber-attacks.

SUMMARY

A computing system for generating allowed lists of applications for machines is provided. The system, for each machine, identifies a set of executed applications that were executed by that machine. The system then clusters the machines based on similarity between the sets of executed applications so that machines with similar sets are in the same cluster. The system then, for each cluster of machines, creates an allowed list of applications for the cluster that includes the applications in the sets of executed applications of the machines of the cluster. An allowed list for a cluster indicates that only applications in the allowed list are allowed to be executed by a machine in the cluster. The system then distributes the allowed list for a cluster to the machines of that cluster so that the machines execute only applications in the allowed list for their cluster.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
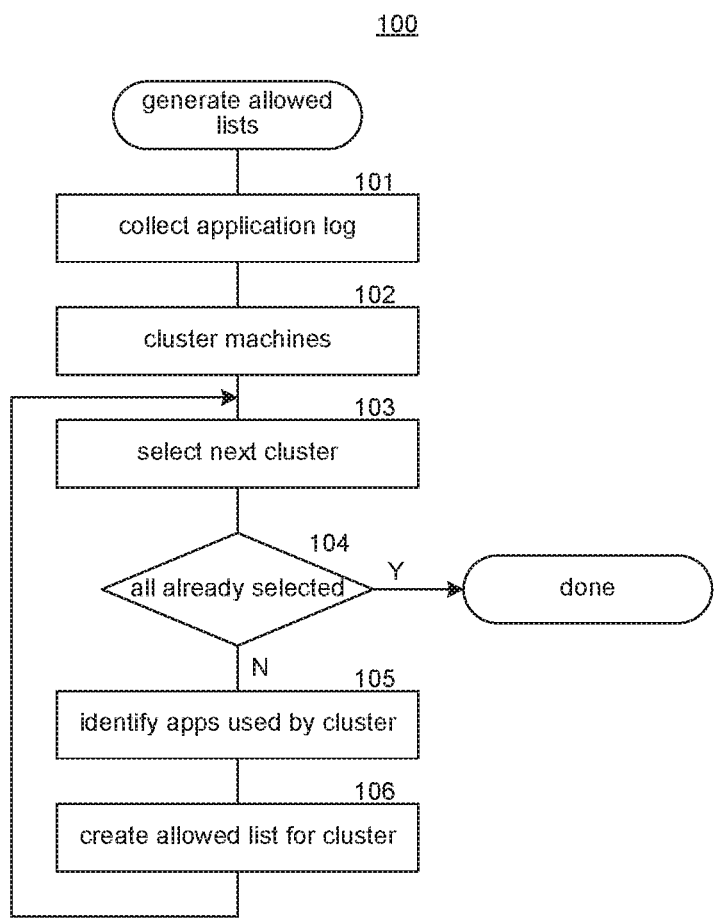
FIG. 1 is a flow diagram that illustrates processing of a generate allowed lists component of the ALG system in some embodiments.

A method and system for automatically generating an allowed list of applications for machines is provided. As used herein, the term "machine" refers to any computing system that can be considered to execute applications, such as servers, virtual machines, user computers, tablets, smartphones, embedded devices, special-purpose computers, and so on. In some embodiments, an allowed list generation ("ALG") system identifies the set of applications executed by machines in a collection of machines (e.g., the machines of an organization) and identifies clusters of machines that will share the same allowed list. For example, the machines may be clustered based on their functions (e.g., database servers in the same cluster), clustered based on manual designation by an administrator, automatically clustered based on similarity of the sets of applications they have executed, and so on. After the clusters are identified, the ALG system creates an allowed list of applications for each cluster. The allowed list for a cluster may include the applications of the sets of the machines of the cluster that are in each set of a machine in the cluster—that is, the allowed list for a cluster may be the intersection of the sets of the machines in the cluster. The ALG then distributes the allowed list of each cluster to the machines in the cluster so that a security tool on each machine can enforce the allowed list by allowing execution of applications on the allowed list and blocking execution of applications that are not on the allowed list.

In some embodiments, the ALG system may collect from the machines process creation logs generated by the operating system. A process creation log may specify for each application an identifier of the application (e.g., name or hash of the code of the application), time of process creation, type of application, and so on. The ALG system may also collect from the machines other logs generated by various software systems, such as logs of dynamic-link libraries loaded, logs of scripts executed, logs of drivers loaded, and so on. To generate the set of applications executed by a machine, the ALG system analyzes the logs to identify all the applications executed by the machine and adds each application to the set for the machine. For example, if the log indicates that a machine executed application A once an hour, application B once a day, and application C at various times, the set would be {A, B, C}. Prior to processing the logs, the ALG system may divide a log into a training log and a testing log. For example, if a log covers four weeks, the training log may encompass the first three weeks, and the testing log may encompass the last week. Training logs may be used to generate the allowed lists, and the testing log may be used to test the allowed lists as described below in more detail.

In some embodiments, the ALG system clusters the machines based on similarity of the sets of applications executed by the machine. The following table illustrates example sets of applications for some machines:

| Machine | A | B | C | D | E | F | G |
|---|---|---|---|---|---|---|---|
| 1 | X | X | X | | | | |
| 2 | X | X | X | X | | | |
| 3 | X | X | X | | | | |

-continued

| Machine | A | B | C | D | E | F | G |
|---|---|---|---|---|---|---|---|
| 4 | X | | | X | X | X | |
| 5 | X | | | X | X | X | X |

An "x" indicates that the application is in the set of a machine. For example, machine 1 has the set of {A, B, C}. In this example, the ALG system may assign machines 1, 2, and 3 to one cluster and machines 4 and 5 to another cluster. The cluster for machines 1, 2, and 3 has the allowed list of [A, B, C, D], and the cluster of machines 4 and 5 has the allowed list of [A, D, E, F, G]. The ALG system may use various similarity criteria to determine whether sets are similar. For example, a similarity criterion may be that the sets have a certain percentage of their applications in common. Another similarity criterion may be a cosine similarity between a feature vector with a dimension for each application that is set to 0 or 1 to indicate whether each application is in the set. The ALG system may use various clustering algorithms. For example, when determining whether to place a machine in a cluster, the ALG system may compare the set for the machine to the intersection of the sets of the machines already in the cluster to determine whether the similarity criterion is satisfied. If so, the ALG system adds the machine to the cluster. If the similarity criterion is not satisfied for any cluster, the ALG system may create a new cluster that contains only that machine.

In some embodiments, the ALG system may filter out machines whose execution of applications appears to be "unstable." For example, a pool of user computers may be available to be used by various groups within an organization as a backup in case of failures in other user computers. In such as case, the execution of applications by the user computers in the pool may be considered unstable in the sense that on different days, the user computer may execute very different sets of applications. The ALG system may use various unstable criteria to determine whether a machine is unstable. For example, the unstable criteria may be that the cardinality of a set of applications for a machine exceeds a certain threshold, that the timing of the execution of the applications in the set appears to be random, and so on. When a machine is determined to be unstable, the ALG system may remove the machine from the machines that are clustered. As a result, a different mechanism may be employed to generate the allowed lists for unstable machines (e.g., manually by an administrator).

In some embodiments, the ALG system may perform various testing of the allowed lists to ensure their effectiveness. As described above, the ALG system may generate the allowed lists based on sets derived from the portions of the logs designated as training logs. One test, referred to as a screening test, to determine the effectiveness of an allowed list for a machine may be to compare the applications in the allowed list to the applications in the test log for that machine. If the test log indicates that one more applications were executed that are not in the allowed list, then the test is considered to have failed because the allowed list may not be appropriate for that machine. Another test, referred to as an audit, would be to collect additional audit logs of a machine, generated during non-enforcement of the allowed list, that indicate the applications executed by the machine. The ALG system then compares the applications in the allowed list to the applications in the audit logs. If the audit logs indicate that one or more applications were executed that are not in the allowed list, then the test is considered to have failed because the allowed list may not be appropriate for that machine. Yet another test, referred to as an enforcement test, would be to collect enforcement logs of a machine, generated during enforcement of the allowed list, that indicate the applications whose execution was allowed and the applications whose execution was blocked. If the enforcement logs indicate that an application in the allowed list was never executed, the ALG system may indicate that that application should be considered for removal from the allowed list, especially if no machine in the same cluster executed that application. If the enforcement logs indicate that an application is blocked many times, the ALG system may indicate that that application should be considered for addition to the allowed list, especially if other machines in the same cluster also blocked execution of that application.

Although the ALG system could automatically generate, distribute, and enable enforcement of allowed lists, the ALG system may allow a user to approve the allowed lists, modify the allowed lists, modify clusters, and so on prior to enforcement of the allowed list. In some embodiments, the ALG system provides a user interface through which a user can review the allowed list for a cluster and add applications to or remove applications from the allowed list. The user interface also allows a user to review the machines in each cluster, move machines to different clusters, create new clusters, create allowed lists for new clusters, and so on. The user interface may allow the user to specify baseline applications that should be included in every allowed list and excluded applications that should never be included in an allowed list. In a cloud environment, the ALG system may allow a cloud administrator to specify baseline applications that should be included in every allowed list for every customer. The ALG system may automatically generate the list of baseline applications as the applications that are executed by every machine in the cloud data center. Such applications may include operating systems, virtual machine monitors, performance monitors, maintenance tools, and so on.

The ALG system may provide various statistics to assist a user in reviewing the allowed lists. For example, the ALG system may generate a confidence level for each application in an allowed list to indicate how confident the ALG system is that the application should be in the allowed list for a cluster. In the example above in which the cluster of machines 1, 2, and 3 has the allowed list of [A, B, C, D], the confidence level of applications A, B, and C may be high since each of these applications in the set of each machine of the cluster. The confidence level of application D may be low since it is only in the set for machine 3. A user may have manually directed that machine 3 execute application D, which may be a diagnostic program. In such a case, it may not be appropriate to include application D in the allowed list as indicated by its confidence level. The ALG system presents the confidence levels to the user to assist in the review of the applications. Once the user approves the allowed list for a cluster, it can be distributed to the machines in the cluster and enforcement enabled.

FIG. 1 is a flow diagram that illustrates processing of a generate allowed lists component of the ALG system in some embodiments. A generate allowed lists component 100 generates allowed lists for clusters of machines in a collection of machines. A collection of machines may be the machines of a single customer of a cloud provider. In block 101, the component collects from each machine the application log of the machine. The application log identifies each application that was executed by the machine. In block 102, the component clusters the machines based on the similarity among the sets of applications that the machines executed. In blocks 103-106, the component loops generating the allowed list for each cluster. In block 103, the component selects the next cluster. In decision block 104, if all the clusters have already been selected, then the component completes, else the component continues at block 105. In block 105, the component identifies the applications used by the machines in the cluster as specified by the application logs. In block 106, the component creates an allowed list of applications for the cluster that includes each application executed by a machine in the cluster. The component then loops to block 103 to select the next cluster.

Figure 2:
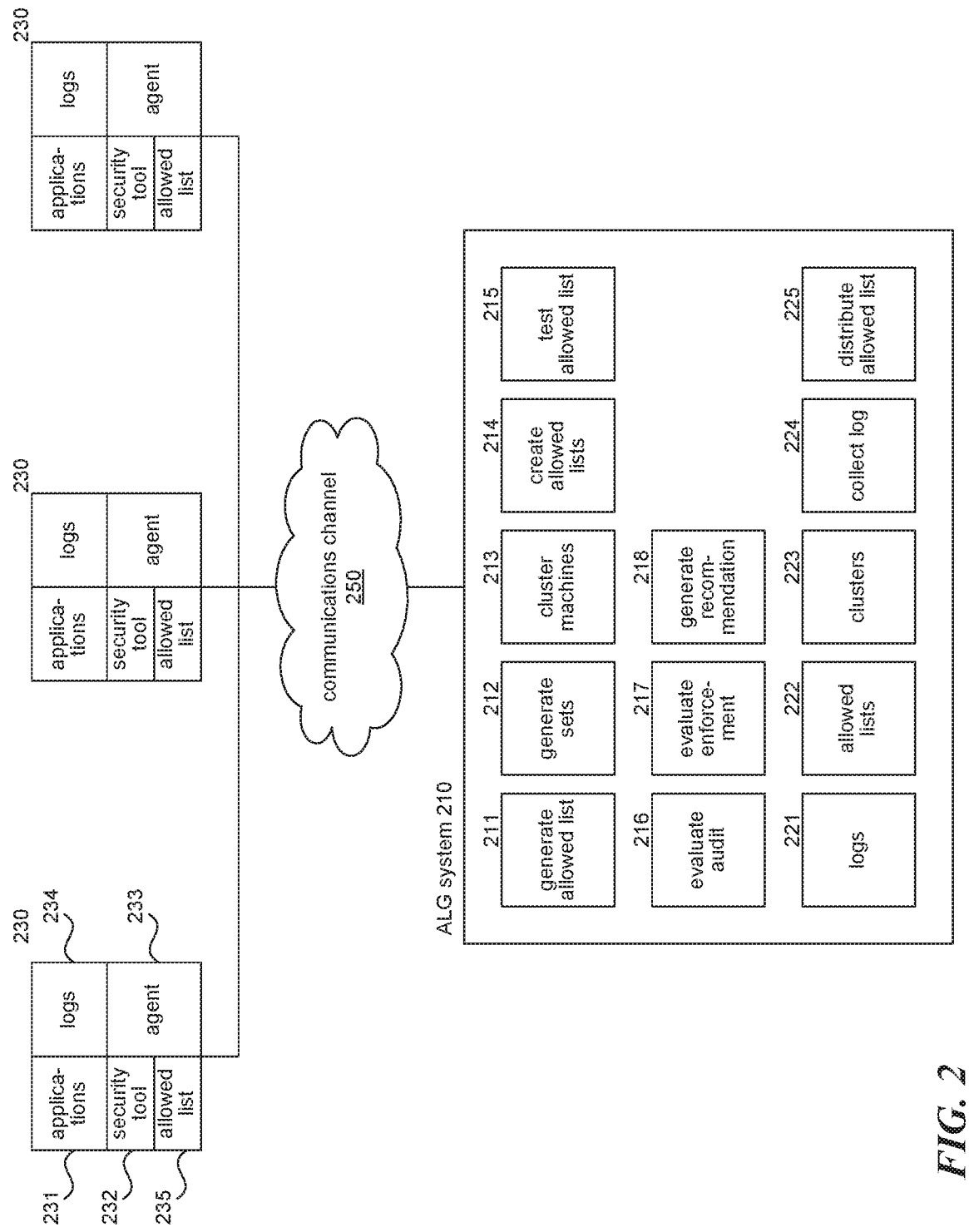
FIG. 2 is a block diagram that illustrates components of the ALG system in some embodiments.

FIG. 2 is a block diagram that illustrates components of the ALG system in some embodiments. The ALG system 210 is connected to machines 230 via a communications channel 250. The ALG system includes a generate allowed list component 211, a generate sets component 212, a cluster machines component 213, a create allowed lists component 214, a test allowed list component 215, an evaluate audit component 216, an evaluate enforcement component 217, and a generate recommendation component 218. The generate allowed list component controls the overall generation of the allowed list. The generate sets component generates sets of applications executed by the machines from the logs collected from the machines. The cluster machines component uses the sets to cluster the machines based on similarity of the sets. The create allowed lists component creates the allowed list for each cluster. The test allowed lists component tests the allowed list using the testing logs. The evaluate audit component evaluates the audit logs as part of an audit test. The evaluate enforcement component evaluates the enforcement logs as part of the enforcement tests. The generate recommendation component generates recommendations for modifying the allowed lists and/or clusters based on the results of the enforcement tests. The ALG system also includes a log store 221, an allowed list store 222, and a cluster store 223. The log store stores the logs collected from the machines. The allowed list store stores the allowed lists generated by the ALG system. The cluster store stores an indication of each cluster and the machines of each cluster. The ALG system also includes a collect log component 224 to collect logs from the machines and a distribute allowed list component 225 to distribute the allowed lists to the machines. Each machine includes various applications 231, a security tool 232, an agent 233, a log store 234, and an allowed list store 235. The security tool is responsible for enforcing the allowed list for the machine. The agent, which may be a machine-side component of the ALG system, gathers the logs of the machine and sends them to the ALG system and receives an allowed list and configures the security tool to use the allowed list.

The computing systems on which the ALG system may be implemented may include a central processing unit, input devices, output devices (e.g., display devices and speakers), storage devices (e.g., memory and disk drives), network interfaces, graphics processing units, accelerometers, cellular radio link interfaces, global positioning system devices, and so on. The computing systems may include servers of a data center, massively parallel systems, and so on. The computing systems may access computer-readable media that include computer-readable storage media and data transmission media. The computer-readable storage media are tangible storage means that do not include a transitory, propagating signal. Examples of computer-readable storage media include memory such as primary memory, cache memory, and secondary memory (e.g., DVD) and other storage. The computer-readable storage media may have recorded on them or may be encoded with computer-executable instructions or logic that implements the ALG system. The data transmission media are used for transmitting data via transitory, propagating signals or carrier waves (e.g., electromagnetism) via a wired or wireless connection.

The ALG system may be described in the general context of computer-executable instructions, such as program modules and components, executed by one or more computers, processors, or other devices. Generally, program modules or components include routines, programs, objects, data structures, and so on that perform particular tasks or implement particular data types. Typically, the functionality of the program modules may be combined or distributed as desired in various embodiments. Aspects of the ALG system may be implemented in hardware using, for example, an application-specific integrated circuit (ASIC).

Figure 3:
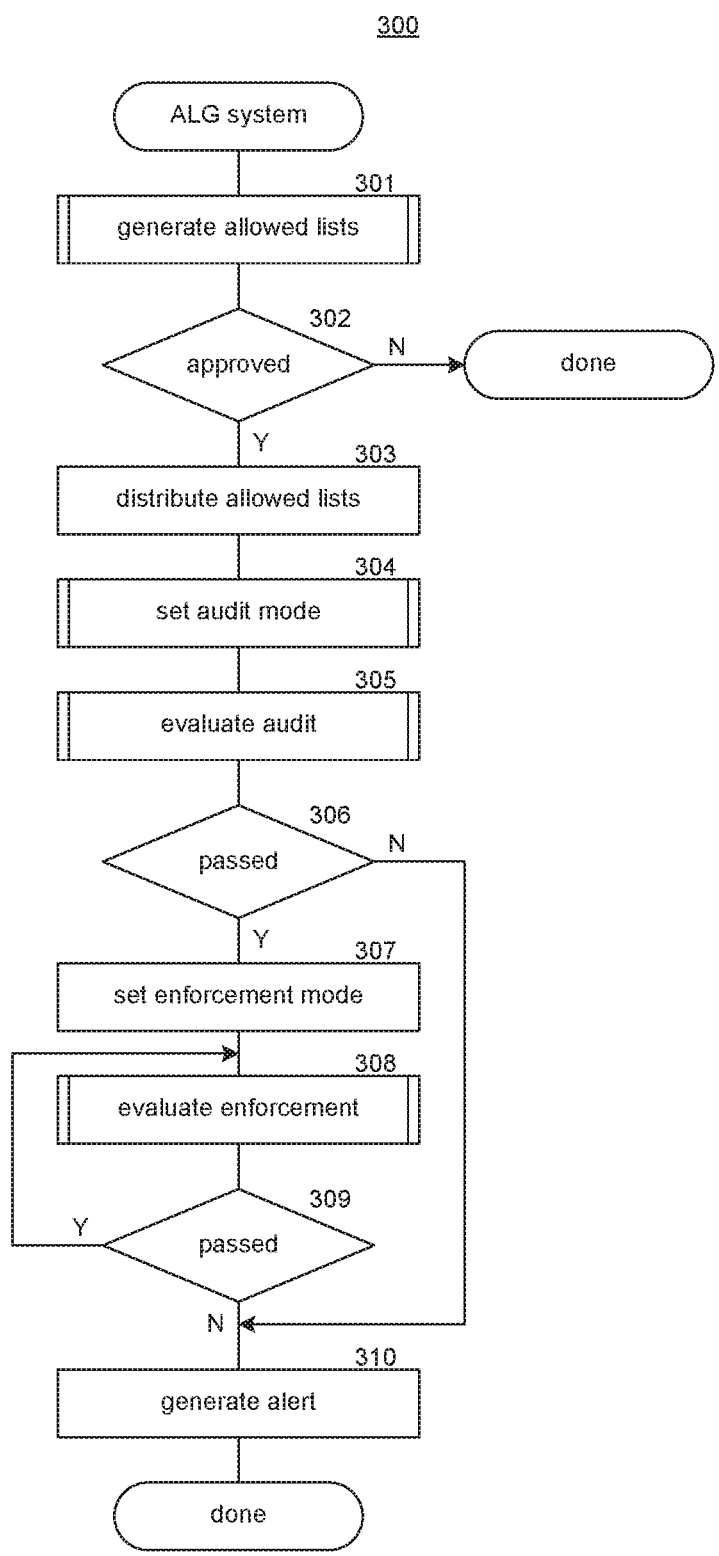
FIG. 3 is a flow diagram that illustrates processing of the ALG system in some embodiments.

FIG. 3 is a flow diagram that illustrates processing of the ALG system in some embodiments. The ALG system 300 generates the allowed lists and evaluates an audit of and enforcement of the allowed lists. In block 301, the component invokes a generate allowed list component to generate the allowed list for machines in a collection. In decision block 302, if the allowed lists were approved by a user, then the component continues at block 303, else the component completes. In block 303, the component distributes the allowed list to the machines. In block 304, the component sets each machine to operate in an audit mode in which the allowed list is not in force and logs of the executed applications are generated. In block 305, the component invokes an evaluate audit component to evaluate the audit of the allowed lists. In decision block 306, if the evaluation indicates that the audit has passed, then the component continues at block 307, else the component continues at block 310. In block 307, the component sets each machine to operate in an enforcement mode in which the allowed lists are enforced. In block 308, the component invokes an evaluate enforcement component to evaluate the enforcement of the allowed lists. In decision block 309, if the evaluation indicates that the enforcement has passed, then the component loops to block 308 to evaluate subsequent enforcements, else the component continues at block 310. In block 310, the component generates an alert indicating that an evaluation has not passed, for example, by notifying a system administrator. The system administrator can then take corrective actions via the user interface to modify the allowed lists or clusters as recommended by the evaluate enforcement component. The component then completes.

Figure 4:
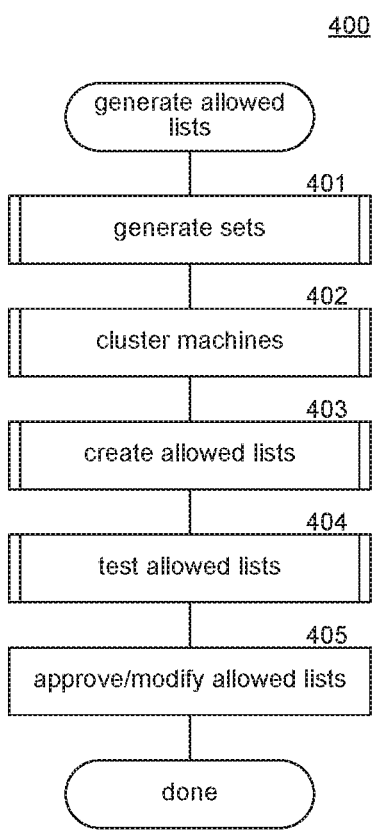
FIG. 4 is a flow diagram that illustrates processing of a generate allowed lists component in some embodiments.

FIG. 4 is a flow diagram that illustrates processing of a generate allowed lists component in some embodiments. A generate allowed lists component 400 is invoked to generate allowed lists for a collection of machines. In block 401, the component invokes a generate sets component to generate for each machine a set of applications executed by that machine. In block 402, the component invokes a cluster machines component to generate clusters of the machines in the collection based on similarity of the sets. In block 403, the component invokes a create allowed list component to create an allowed list for each cluster based on the sets of applications for the machines in the cluster. In block 404, the component invokes a test allowed lists component to test the allowed list using testing logs collected from the machines. In block 405, the component presents the user interface to a user for modification of the allowed lists or clusters and approval of the allowed lists. The component then completes.

Figure 5:
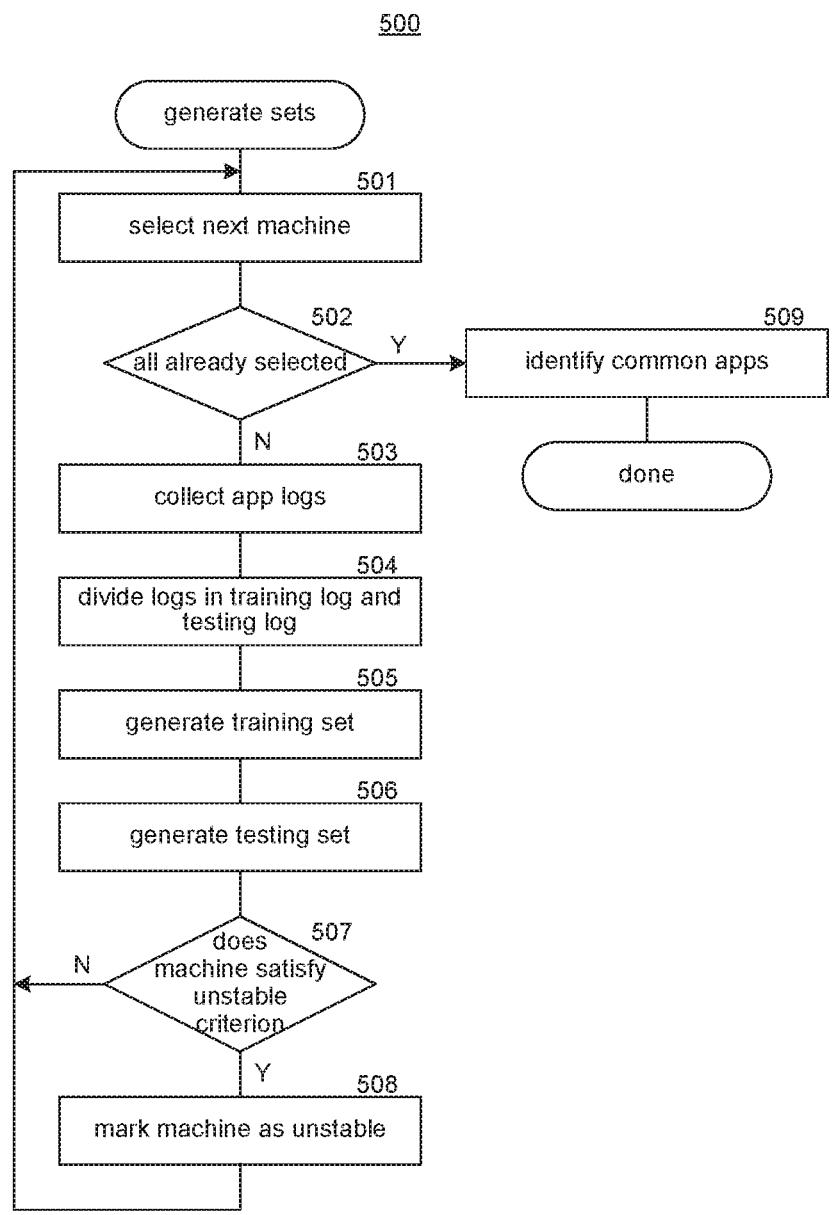
FIG. 5 is a flow diagram that illustrates processing of a generate sets component of the ALG system in some embodiments.

FIG. 5 is a flow diagram that illustrates processing of a generate sets component of the ALG system in some embodiments. A generate sets component 500 is invoked to generate a training set and a testing set of applications executed by each machine based on the logs collected from the machines. In block 501, the component selects the next machine. In decision block 502, if all the machines have already been selected, then the component continues at block 509, else the component continues at block 503. In block 503, the component collects the application logs from the machine. In block 504, the component divides the logs into a training log and a testing log. In block 505, the component generates a training set that includes each application executed by the machine as indicated by the training log. In block 506, the component generates a testing set that includes each application executed by the machine as indicated by the testing log. In decision block 507, if the machine satisfies an unstable criterion, then the component continues at block 508, else the component loops to block 501 to select the next machine. In block 508, the component marks the machine as unstable and then loops to block 501 to select the next machine. In block 509, the component identifies the common applications executed by each machine and may remove the common applications from the sets so that the common applications do not influence the clustering, but are included in each allowed list. The component then completes.

Figure 6:
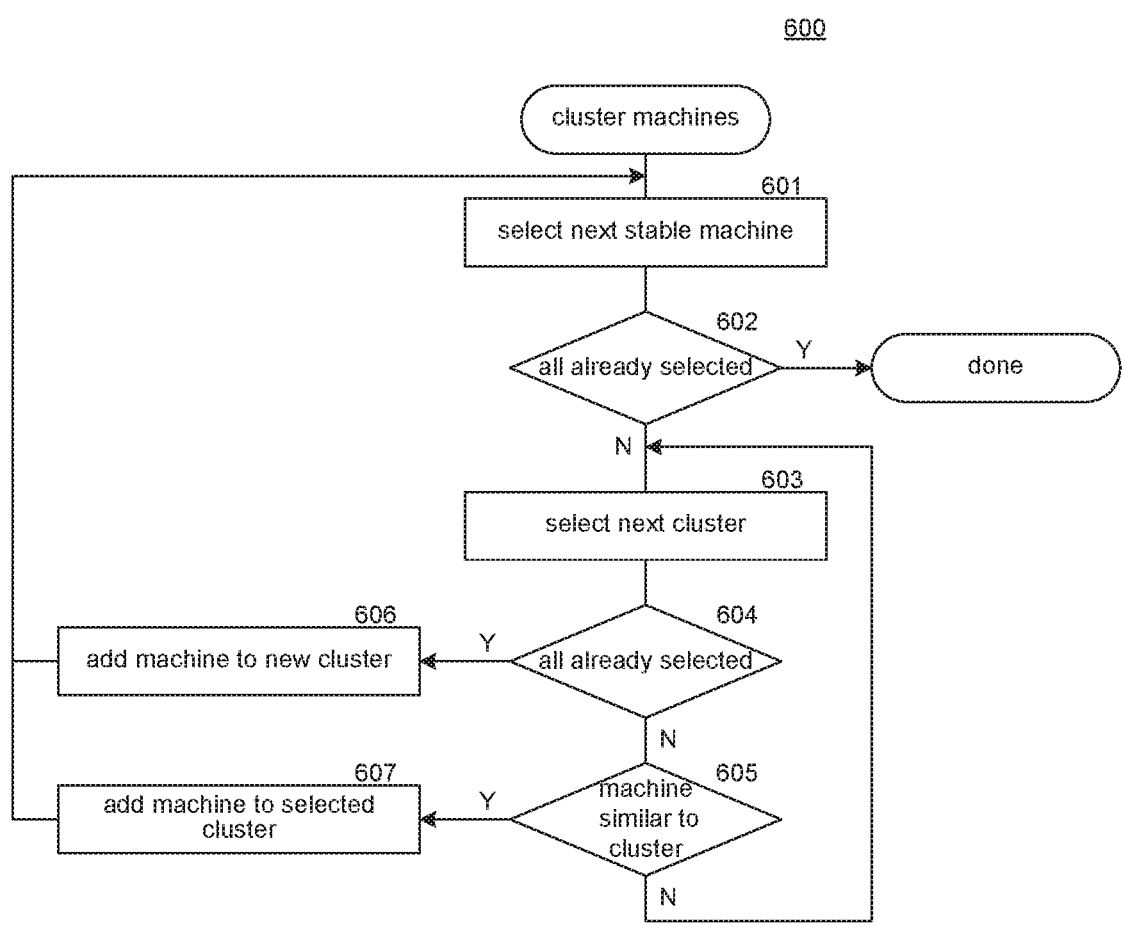
FIG. 6 is a flow diagram that illustrates processing of a cluster machines component in some embodiments.

FIG. 6 is a flow diagram that illustrates processing of a cluster machines component in some embodiments. A cluster machines component 600 is invoked to cluster machines based on sets of applications executed by those machines. In block 601, the component selects the next stable machine. In decision block 602, if all the stable machines have already been selected, then the component completes, else the component continues at block 603. In block 603, the component selects the next cluster. In decision block 604, if all the clusters have already been selected (or there are not yet any clusters), then the component continues at block 606, else the component continues at block 605. In decision block 605, if the selected set of applications for the selected machine is similar to the sets of applications of the machines in the cluster, then the component continues at block 607, else the component loops to block 603 to select the next cluster. In block 606, the component creates a cluster and adds the selected machine to the new cluster and then loops to block 601 to select the next stable machine. In block 607, the component adds the machine to the selected cluster and then loops to block 601 to select the next stable machine.

Figure 7:
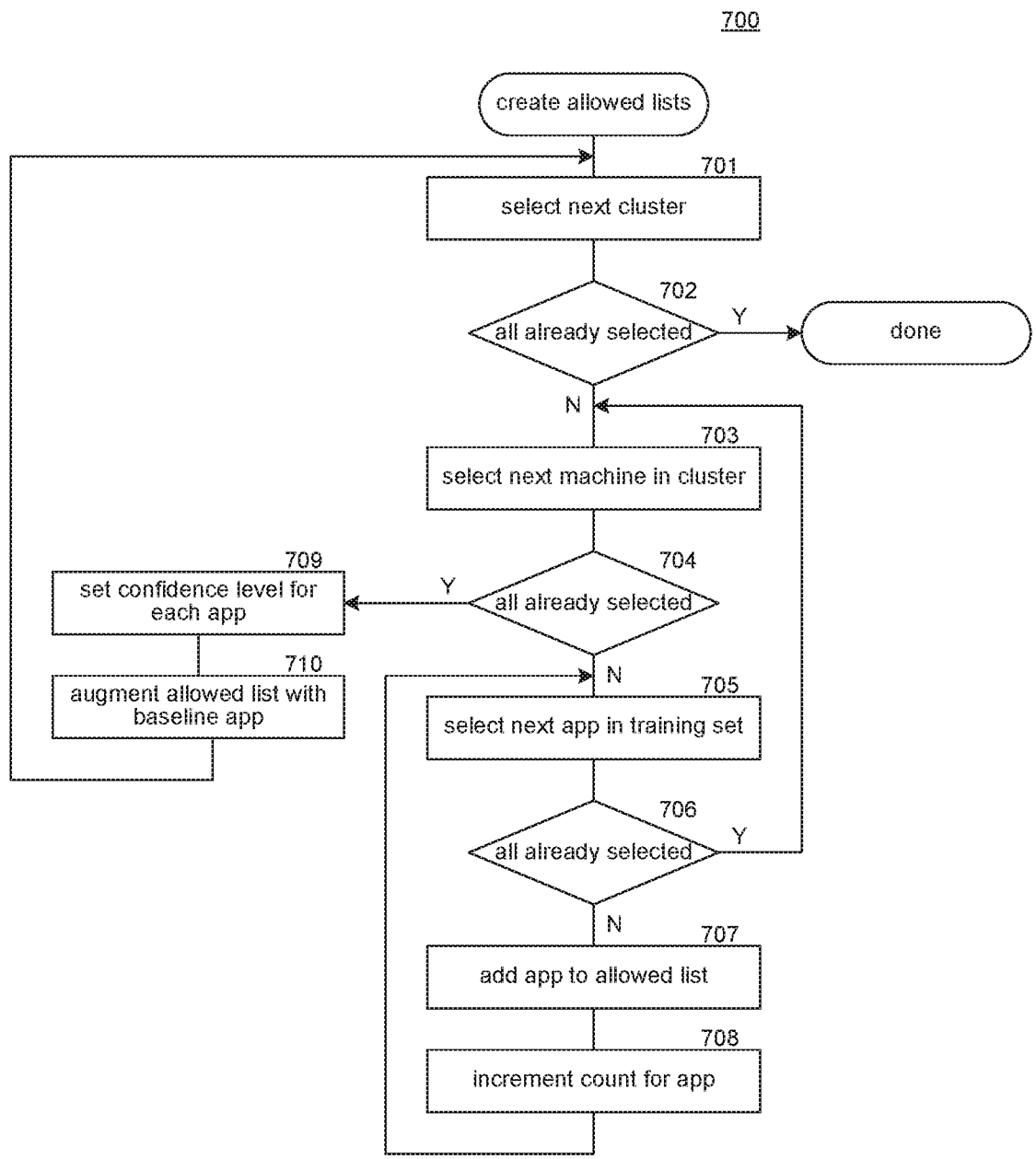
FIG. 7 is a flow diagram that illustrates the processing of a create allowed lists component in some embodiments.

FIG. 7 is a flow diagram that illustrates the processing of a create allowed lists component in some embodiments. A create allowed lists component 700 is invoked to create an allowed list for each cluster. In block 701, the component selects the next cluster. In block 702, if all the clusters have already been selected, then the component completes, else the component continues at block 703. In block 703, the component selects the next machine in the cluster. In decision block 704, if all the machines in the cluster have already been selected, then the component continues at block 709, else the component continues at block 705. In block 705, the component selects the next application in the training set for the selected machine. In decision block 706, if all the applications in the training set have already been selected, then the component loops to block 703 to select the next machine in the cluster, else the component continues at block 707. In block 707, the component adds the application to the allowed list for the selected cluster if not already in the allowed list. In block 708, the component increments a count for the application to indicate how many machines executed the application and then loops to block 705 to select the next application in the training set. In block 709, the component sets a confidence level for each application in the allowed set based on the percentage of machines in the cluster that executed that application. In block 710, the component augments the allowed list with baseline applications such as those applications specified by a customer to be included in each machine, those applications specified by a cloud provider to be included in each machine, or those applications identified as common to all machines of a cloud system. The component then loops to block 701 to select the next cluster.

Figure 8:
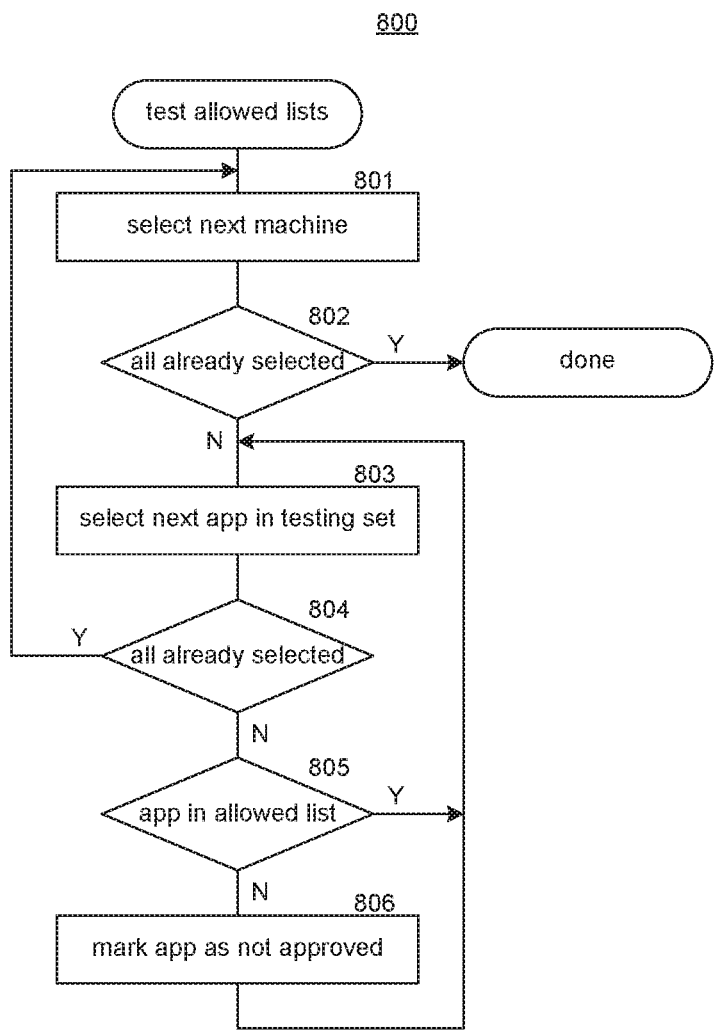
FIG. 8 is a flow diagram that illustrates processing of a test allowed lists component in some embodiments.

FIG. 8 is a flow diagram that illustrates processing of a test allowed list component in some embodiments. A test allowed list component 800 is invoked to test the allowed list for each machine based on the testing set for each machine. In block 801, the component selects the next machine. In decision block 802, if all the machines have already been selected, then the component completes, else the component continues at block 803. In block 803, the component selects the next application in the testing set. In decision block 804, if all the applications in the testing set for the machine have already been selected, then the component loops to block 801 to select the next machine, else the component continues at block 805. In decision block 805, if the application is in the allowed list, then the component loops to block 803 to select the next application in the testing set, else the component continues at block 806. In block 806, the component marks the application as not approved to indicate that the allowed list has not passed the test, and the component loops to block 803 to select the next app in the testing set.

Figure 9:
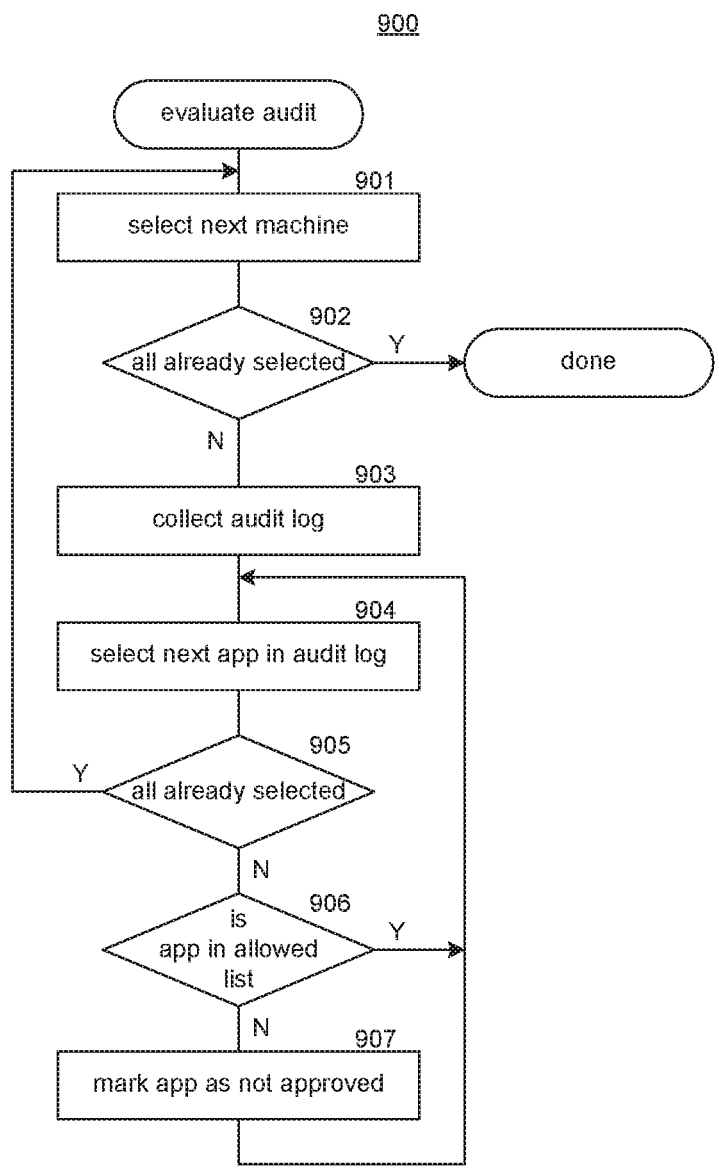
FIG. 9 is a flow diagram that illustrates processing of an evaluate audit component of the ALG system in some embodiments.

FIG. 9 is a flow diagram that illustrates processing of an evaluate audit component of the ALG system in some embodiments. An evaluate audit component 900 is invoked to evaluate an audit of the allowed list for the machines. In block 901, the component selects the next machine. In decision block 902, if all the machines have already been selected, then the component completes, else the component continues at block 903. In block 903, the component collects the audit log from the machine. In block 904, the component selects the next application in the audit log. In decision block 905, if all the applications in the audit log have already been selected, then the component loops to block 901 to select the next machine, else the component continues at block 906. In decision block 906, if the application is in the allowed list, then the component loops to block 904 to select the next application in the audit log, else the component continues at block 907. In block 907, the component marks the application as not approved to indicate that the allowed list did not pass the test and loops to block 904 to select the next application in the audit log.

Figure 10:
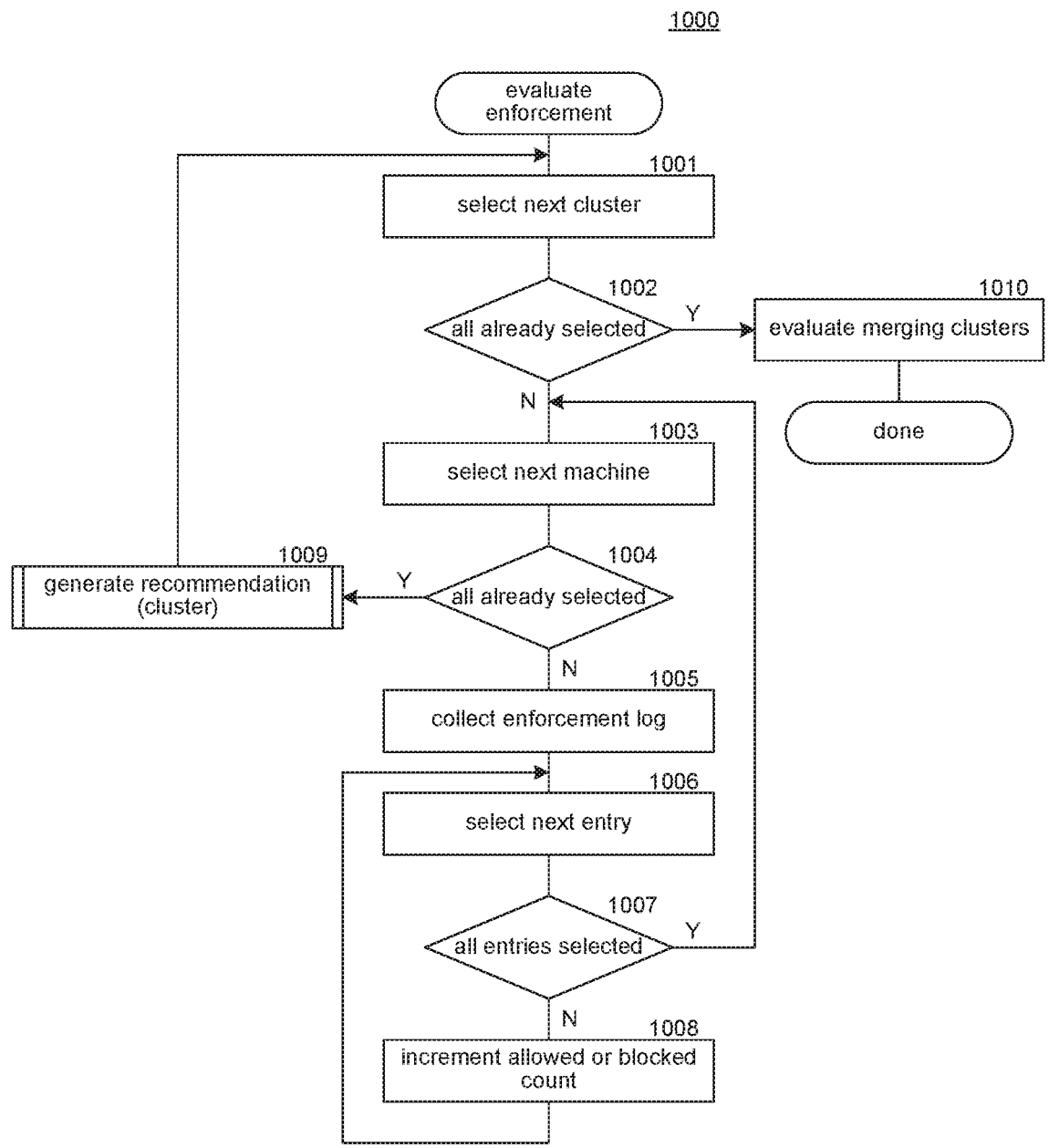
FIG. 10 is a flow diagram that illustrates processing of an evaluate enforcement component of the ALG system in some embodiments.

FIG. 10 is a flow diagram that illustrates processing of an evaluate enforcement component of the ALG system in some embodiments. An evaluate enforcement component 1000 is invoked to evaluate enforcement of the allowed list for the machines in each cluster. In block 1001, the component selects the next cluster. In decision block 1002, if all the clusters have already been selected, then the component continues at block 1010, else the component continues at block 1003. In block 1003, the component selects the next machine in the cluster. In decision block 1004, if all the machines in the cluster have already been selected, then the component continues at block 1009, else the component continues at block 1005. In block 1005, the component collects the enforcement log for the machine. In block 1006, the component selects the next entry in the enforcement log. In decision block 1007, if all the entries in the enforcement log have already been selected, then the component loops to block 1003 to select the next machine, else the component continues at block 1008. In block 1008, the component increments an allowed count or blocked count for the application depending on whether the entry indicates that execution of an application was allowed or blocked. The component then loops to block 1006 to select the next entry in the enforcement log. In block 1009, a generate recommendation component is passed an indication of the cluster and generates a recommendation on whether to modify the allowed list for the cluster based on the counts of applications that are allowed or blocked. The component then loops to block 1001 to select the next cluster. In block 1010, the component evaluates whether to recommend to a user to merge clusters based on similarity among the allowed lists of the clusters. The component then completes.

Figure 11:
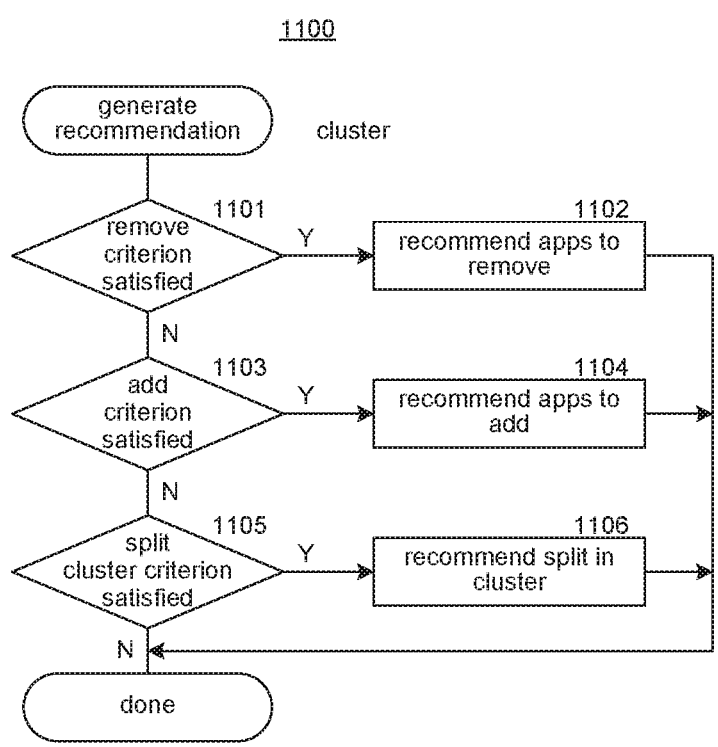
FIG. 11 is a flow diagram that illustrates processing of a generate recommendation component of the ALG system in some embodiments.

FIG. 11 is a flow diagram that illustrates processing of a generate recommendation component of the ALG system in some embodiments. A generate recommendation component 1100 is invoked to generate a recommendation on whether to modify an allowed list or to split a cluster. In decision block 1101, if a criterion is satisfied to remove an application from the allowed list for the cluster, then the component continues at block 1102, else the component continues at block 1103. In block 1102, the component generates a recommendation to remove one or more applications from the allowed list and then completes. In decision block 1103, if the criteria is satisfied to add an application to the allowed list for the cluster, then the component continues at block 1104, else the component continues at block 1105. In block 1104, the component generates a recommendation to add one or more applications to the allowed list and then completes. In decision block 1105, if a split cluster criterion is satisfied, then the component continues at block 1106, else the component completes. In block 1106, the component generates a recommendation to split the cluster and then completes.

Although the subject matter has been described in language specific to structural features and/or acts, it is to be understood that the subject matter defined in the appended claims is not necessarily limited to the specific features or acts described above. Rather, the specific features and acts described above are disclosed as example forms of implementing the claims. Accordingly, the invention is not limited except as by the appended claims.

The invention claimed is:

1. A method performed by a computing system for generating an allowed list of applications for machines, the method comprising:
   for each machine, identifying a set of executed applications that were executed by the machine;
   dividing the executed-application set for each machine into a training set and a testing set;
   generating clusters of the machines;
   for each cluster of machines, creating an allowed list of applications for the cluster that includes the applications in the training sets of the machines of the cluster, the allowed list indicating that only applications in the allowed list are allowed to be executed by a machine in the cluster;
   testing the allowed list for a cluster to determine whether an executed application in the testing set is not in the allowed list;
   for a machine, generating an enforcement log of allowed applications whose execution was allowed and blocked applications whose execution was blocked; and
   analyzing the enforcement log to determine whether to adjust the allowed list for a cluster.

2. The method of claim 1 wherein the clusters are generated based on similarity among the executed-application sets of the machines.

3. The method of claim 1 further comprising identifying a common-application set that is the intersection of the sets of the machines wherein the generating of the clusters does not factor in the applications of the common-application set.

4. The method of claim 1 further comprising ensuring that the allowed list includes baseline applications whose execution is to be allowed by each machine.

5. The method of claim 1 further comprising, after generating the allowed list for a cluster, auditing the allowed list for a machine in the cluster by generating an audit log of applications executed by the machine without enforcing the allowed list, and when the audit log indicates that the machine executed an application that is not in the allowed list, indicating that the allowed list for the machine has not passed the audit.

6. The method of claim 1 further comprising distributing the allowed list for a cluster to the machines within the cluster and enabling enforcement of the allowed list by the machines.

7. The method of claim 1 wherein adjustments to the allowed list are selected from a group consisting of reducing the allowed list, expanding the allowed list, splitting a cluster, or merging a cluster.

8. The method of claim 6 further comprising presenting the allowed list to a user for approval prior to enabling enforcement.

9. The method of claim 8 further comprising receiving from the user an indication to modify an allowed list or to modify a cluster.

10. The method of claim 1 wherein an application is selected from a list consisting of an operating system component, a driver, an executable file, a script, an add-on, and a dynamic-link library.

11. A computing system generating an allowed list of applications for machines, the computing system comprising:
a computer-readable storage medium, which does not include a transitory propagating signal, storing computer-executable instructions that when executed control the computing system to:
collect from each machine an execution log that indicates applications that were executed by the machine;
generate for each machine an executed-application set that indicates executed applications that were executed by the machine based on analysis of the execution log for the machine;
divide the executed-application set for each machine into a training set and a testing set;
generate clusters of the machines based on similarity among the executed-application sets of the machines such that machines with similar executed-application sets are in the same cluster;
create for each cluster an allowed list of applications for the cluster that includes the applications in the training sets of the machines of the cluster, the allowed list for a cluster being a set of executed applications that is an intersection of the executed-application sets of the machines in the cluster;
test the allowed list for a cluster to determine whether an executed application in the testing set is not in the allowed list;
for a machine, generate an enforcement log of allowed applications whose execution was allowed and blocked applications whose execution was blocked; and
analyze the enforcement log to determine whether to adjust the allowed list for a cluster; and
distribute the allowed list for each cluster to the machines in that cluster so that each machine of a cluster can enforce the allowed list of the cluster, the machines of a cluster allow execution of only the applications in the allowed list and block execution of all other applications; and
a processor that executes the computer-executable instructions stored in the computer-readable storage medium.

12. The computing system of claim 11 wherein the execution log for a machine has an ending time and wherein the computer-executable instructions further control the computing system to test an allowed list for a machine by determining whether the machine executed an application not on the allowed list after the ending time and prior to enforcement of the allowed list.

13. The computing system of claim 11 wherein the computer-executable instructions further control the computing system to present the allowed lists to a user for modification of the allowed lists or modification of the clusters.

14. The computing system of claim 11 wherein the computer-executable instructions further control the computing system to, prior to enabling enforcement of an allowed list, present the allowed list to a user for approval.

15. The computing system of claim 11 wherein the computer-executable instructions further control the computing system to automatically enable enforcement of the allowed lists without user intervention.

16. The computing system of claim 11 wherein the machines are hosted at a data center of a data center provider that hosts machines of multiple customers and wherein the machines of each customer are clustered separately.

17. The computing system of claim 11 wherein the machines are hosted by data centers of multiple data center providers.

18. A computer-readable storage medium, which does not include a transitory propagating signal, storing computer-executable instructions to control a computing system to generate an allowed list of applications for machines, the computer-executable instructions comprising instructions that control the computing system to:
generate clusters of the machines based on similarity among the sets of applications executed by the machines such that machines with similar sets of applications are in the same cluster;
divide the executed-application set for each machine into a training set and a testing set;
create an allowed list of applications for each cluster that includes the applications in the training sets of the machines of the cluster and is an intersection of the sets of applications executed by the machines in the cluster;
test the allowed list for a cluster to determine whether an executed application in the testing set is not in the allowed list;
for a machine, generate an enforcement log of allowed applications whose execution was allowed and blocked applications whose execution was blocked; and
analyze the enforcement log to determine whether to adjust the allowed list for a cluster; and direct distribution of the allowed list for each cluster to the machines in that cluster so that each machine executes only those application that are in the allowed list that is distributed to it.

\* \* \* \* \*